United States Patent [19]
Haywood

[11] 3,721,899
[45] March 20, 1973

[54] CONTINUITY TEST AND INDICATING CIRCUIT

[75] Inventor: John T. Haywood, Burlington, N.C.

[73] Assignee: The United States of America as represented by the Secretary of the Army

[22] Filed: Oct. 6, 1971

[21] Appl. No.: 187,034

[52] U.S. Cl. .................................324/73 R, 324/51
[51] Int. Cl. ....................G01r 15/12, G01r 31/02
[58] Field of Search ...............................324/51, 73 R

[56] References Cited

UNITED STATES PATENTS 3,439,268  4/1969  Gregory et al..........................324/51
3,492,571  1/1970  Desler....................................324/73

Primary Examiner—Rudolph V. Rolinec
Assistant Examiner—Ernest F. Karlsen
Attorney—Charles K. Wright et al.

[57] ABSTRACT

The circuitry of modules is checked by the use of a switching device which selectively connects all possible combinations of pairs of terminals of a selected module to a sensing circuit. The sensing circuit enables a selective SCR when there is continuity between the selective pairs of terminals. The enabled SCRs cause a further switching system to be programed in a binary fashion whereby the switching system will power an indicator to visually show all the connections in the module.

1 Claim, 3 Drawing Figures

United States Patent
Haywood
[11] 3,721,899
[45] March 20, 1973
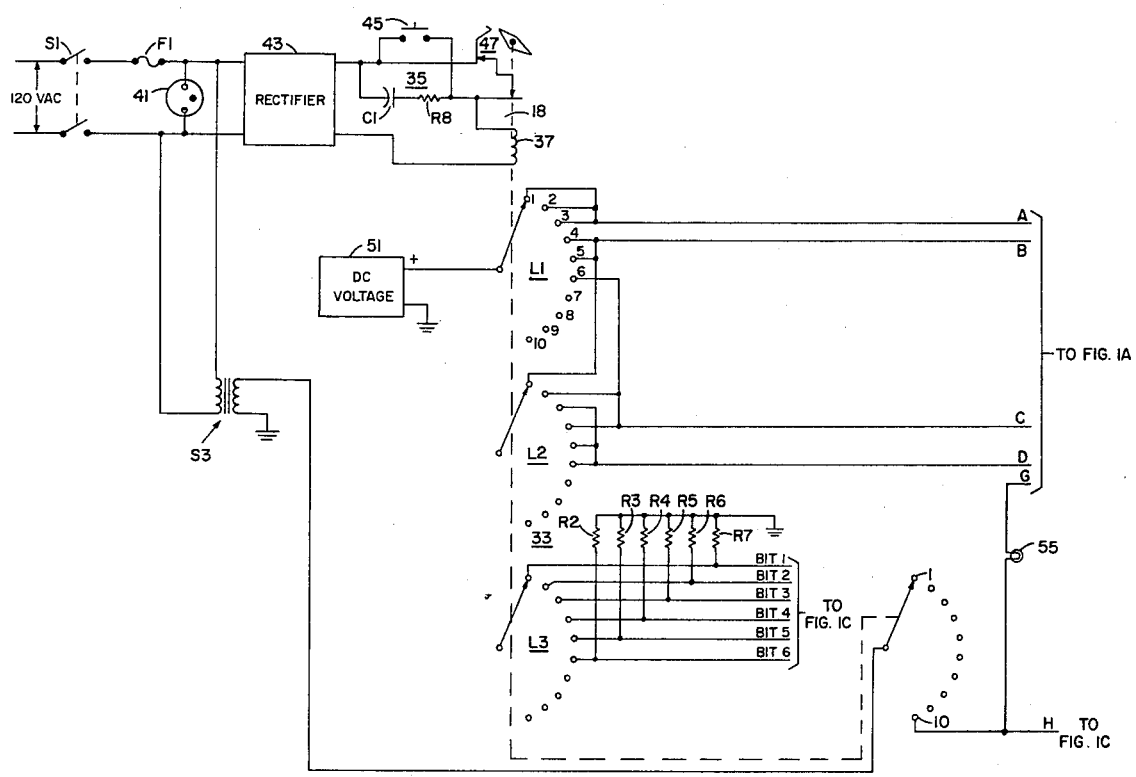
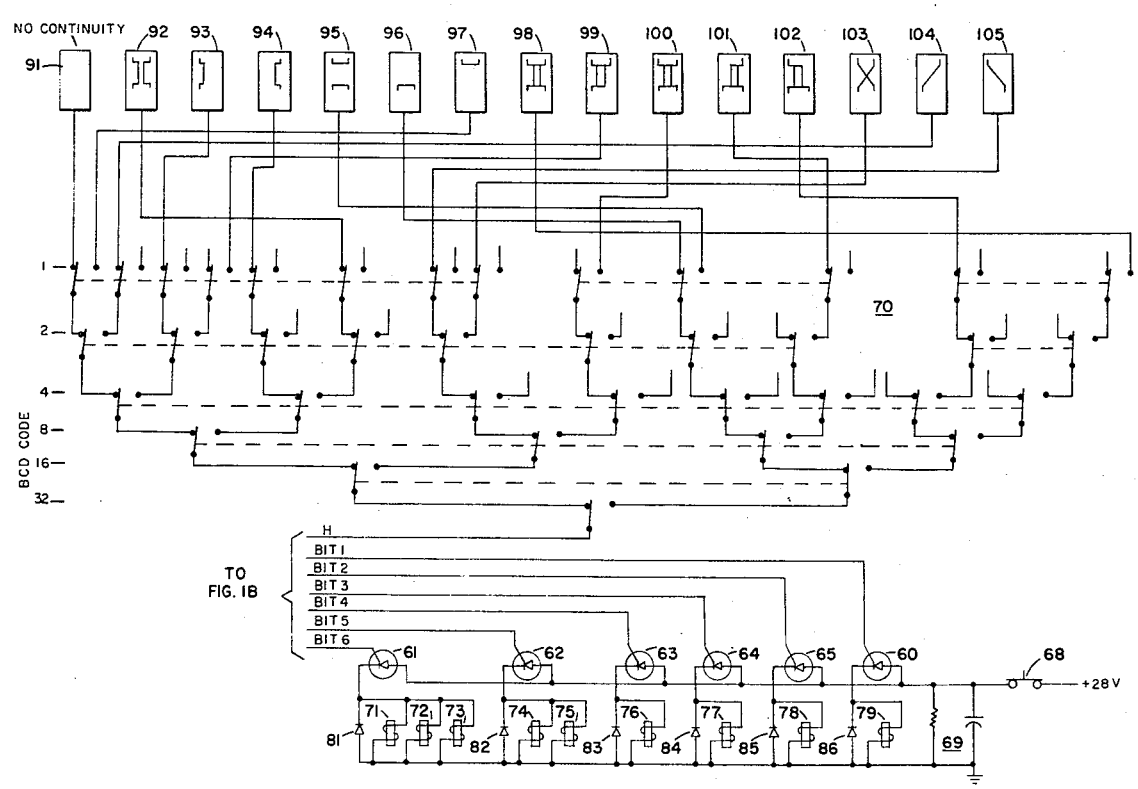

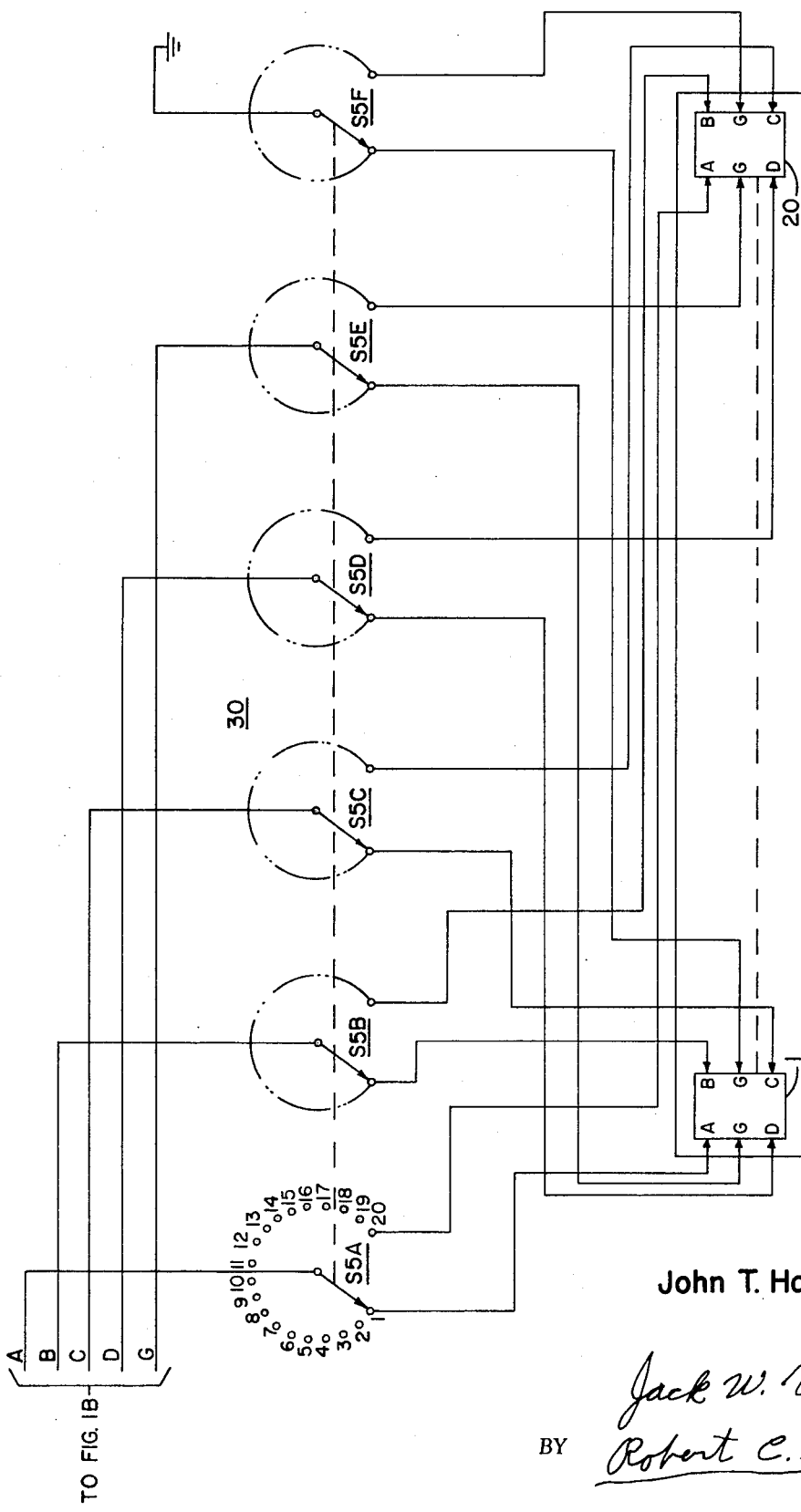
FIG. IA
John T. Haywood,
INVENTOR.

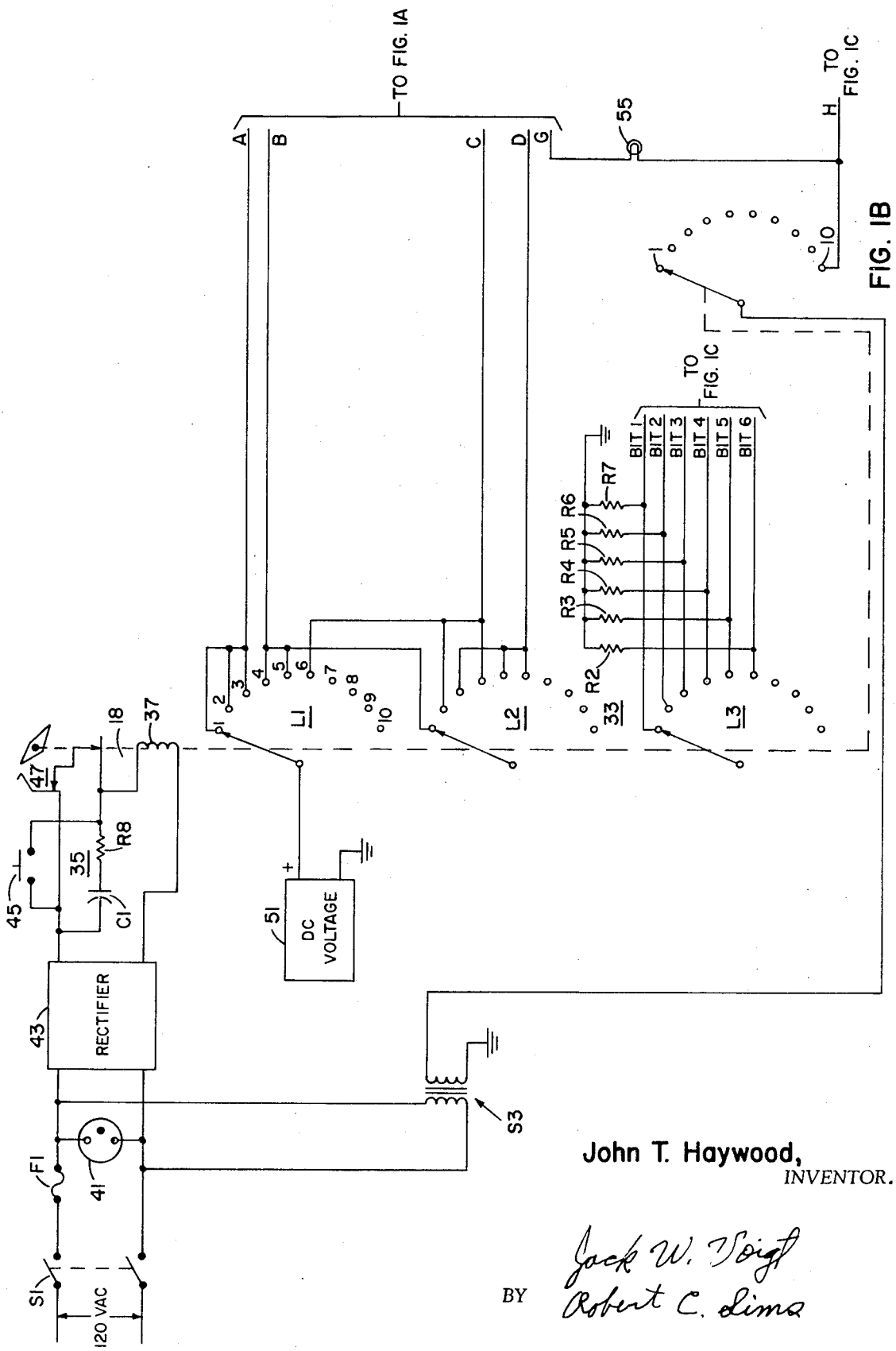
FIG. IB
John T. Haywood,
INVENTOR.

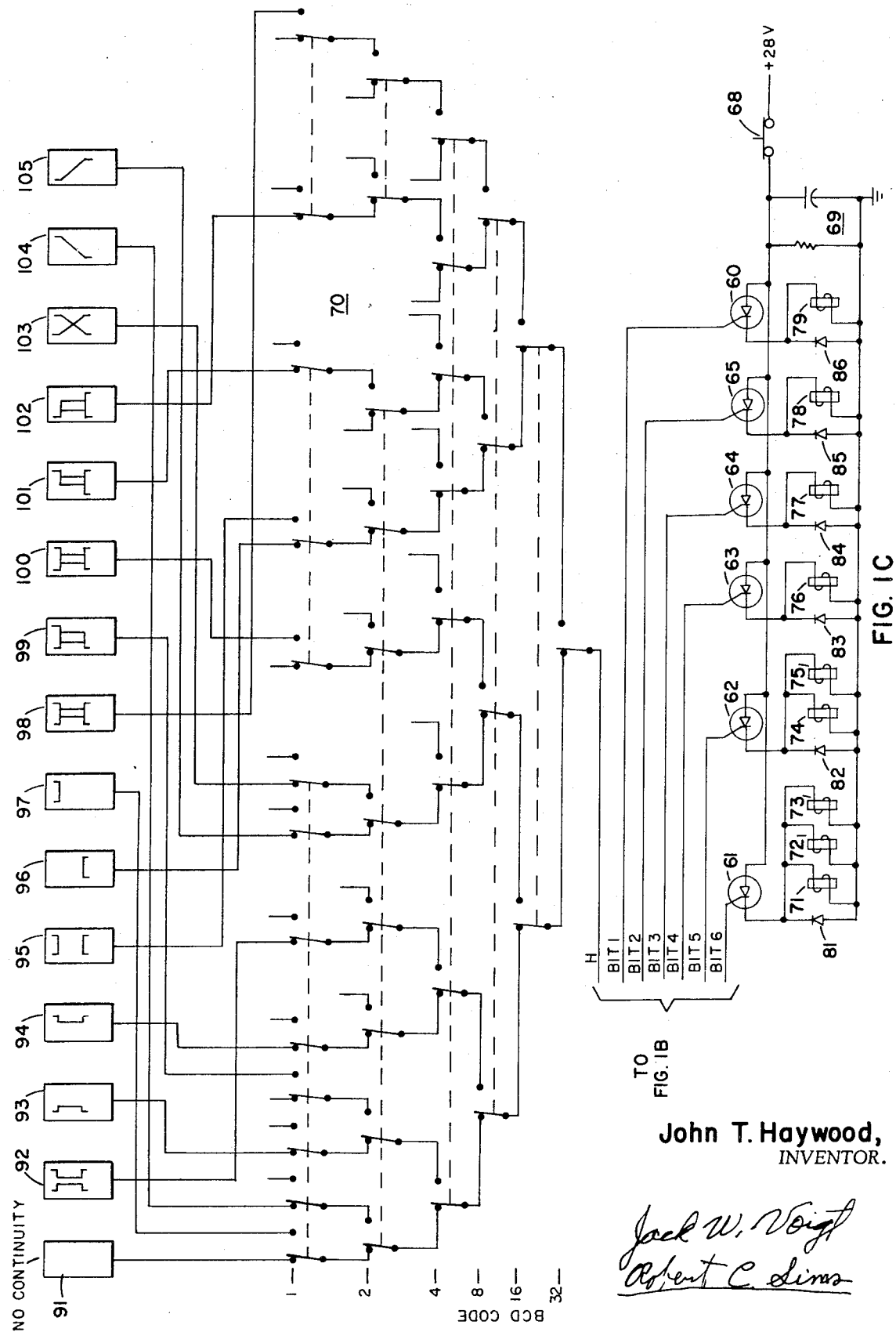

CONTINUITY TEST AND INDICATING CIRCUIT

BACKGROUND OF THE INVENTION

This invention is related to the field of measuring and testing. More particularly this invention is related to the field of continuity testing. Prior art devices all require the recording of data as each pair of terminals was checked. In order to get a complete readout the accumulation of data had to be correlated. This was tedious and time consuming and very often errors would be made in the correlation of the data.

SUMMARY OF THE INVENTION

A plurality of modules which are used to interconnect logic boards in other systems are checked by the present invention. The modules are wired to a plurality of selector switches whereby each of the terminals of a selective one of the modules may be connected to a further switching circuit. This switching circuit contains an oscillating circuit which operates a stepping switch to move a pair of contact arms wired to the selected module so as to make every possible connection between pairs of terminals of the selected module. A plurality of indicators which shows the circuit configuration of all the possible combinations of interconnections of the terminals of the module are connected to a digital switching system. The control of the position of the digital switching system and therefore the control of which particular indicator is selected is provided by the combination of a silicon control rectifier (SCR) bank and the relay arms of the switches. The overall configuration of the digital switch is therefore determined by which SCRs are enabled. A particular SCR is enabled by connection of a power source through one of the selected pairs of terminals of the selected module through the SCR and back to the other side of the power source. If the selected pair of the terminals of the selected module is an open circuit then the SCR will not be enabled. If the selected pair of terminals is a closed circuit then the SCR will be enabled and the corresponding switch will be activated. After the last possible combination of the pairs of terminals of the selected module has been connected to its corresponding SCR, the indicator is read and it will indicate the connections of the selected module. Then a reset circuit and a start switch are activated, another module is selected by the selector switches and the procedure is repeated.

BRIEF DESCRIPTION OF THE DRAWINGS

FIGS. 1A–C collectively represent a schematic showing of a preferred embodiment of the invention.

DESCRIPTION OF THE PREFERRED EMBODIMENT

Referring to FIG. 1A there is shown a plurality of modules 1–20. For the sake of clarity only modules 1 and 20 are shown in the drawing. These modules may be of any of the known type modules which are used to interconnect different circuits. The number of terminals of the modules shown in this preferred embodiment is six. Two of the terminals being ground terminals identified as G. The other four terminals are A, B, C and D. A switching bank 30 is provided with a plurality of selector switches S5A–S5F each selector switch has 20 terminals so as to correspond to the number of modules. Switch S5F connects the ground system of the module to the ground system of the testing circuit. All of the selector switches are ganged together so as to select all of the terminals of a particular one of the modules 1–20. In other words if the selector switches are connected to terminal 1 as shown in FIG. 1A then module 1 has been selected and each of its terminals are correspondedly connected to lines A, B, C, D and G.

Referring to FIG. 1B lines A, B, C, D and G are continuations of the lines from FIG. 1A. A further set of ganged selector switches 33 contains switches L1, L2, L3 and L4. An oscillating circuit 35 operates the solenoid 37 so as to step contact arms of switches L1–L3 to make every possible connection between any two of the terminals A, B, C and D. Oscillator 35 and stepping solenoid coil 37 are supplied from a 120 volts ac power supply by way of switch S1 fuse F1 voltage regulating tube 41 and rectifier 43. Any of the well known devices may be used to step switch 33. A starting switch 45 is provided for the oscillator 35. A switch interrupter means 47 is provided to control the oscillator. A dc voltage supply 51 provides power to the contact arm of selector switch L1. The path of this power will be through the contact arm of selector switch L1 one of the selected terminals of the module through the module (if a completed path is available) out the other selected terminal of the module to the contact arm of switch L2 and contact arm of switch L3 to the selected bit 1–6. Resistors R2–R7 may be provided to complete the path from switch L3 to the ground side of voltage 51. The 120 volts ac power source also provides a voltage to switch L4 by way of step down voltage transformer 53. This voltage will be fed to line H when the selector switches are in position 10. An indicator bulb 55 may be provided for a check of the ground connection of the module.

Referring to FIG. 1C bits 1–6 in line H correspond to those from FIG. 1B. A plurality of silicon control rectifiers (SCRs) 61–66 are connected to a 28 volts power source by way of reset switch 68 and filter 69. These SCRs will be enabled if a voltage is present at its trigger electrode from bits 1–6. Once a SCR has been enabled it will stay in the on position until the voltage on its anode circuit is reduced to zero. A binary switch 70 has its position controlled by solenoid coils 71–79. For example if bit 6 had a voltage on it sometime during the run then silicon control rectifier 61 would have been enabled and control coils 71, 72 and 73 would have power thereon which would cause switches under the binary "1" to all be moved to the down position. Rectifiers 81–86 may be provided to prevent a high back voltage on the SCRs from the coils 71–79 upon resetting. Indicators 91–105 are connected to switch 70 and ground so as to complete a path for a light bulb therein, not shown, and to give a visual readout of the circuitry of the selected module. For example if upon testing all of the possible connections of the pairs of circuits of the selected modules no voltage was present on any of the bits 1–6 then the circuit would be in the position as shown in FIG. 1C. When the selector switch 33 reaches position 10 power will be provided to terminal H which in turn will provide power to switch 70 of FIG. 1C. Through the connections of switch 70 the power will be provided to indicator 91 which would then light up, and of course show the indication that there is no continuity for any of the circuits in the module.

For a complete operation of this system refer to FIGS. 1A-1C. A plurality of modules to be tested are connected to the switches 30 as shown in FIG. 1A. Although only 20 modules are shown obviously more than that could be set up in the circuitry by increasing the number of terminals on switch 30. The selector switch 30 then is moved to select a particular module to be tested. In the usual application selector switch will be first connected to terminal 1 and then 2 and so on so as to test all 20 of the modules. Next to start the cycle reset switch 68 is depressed; therefore disconnecting power to the SCR 61-66 and causing them to go into the unenabled state or off state. Switch 45 is depressed; starting oscillator 35 to step switch 33. This causes each of the terminals to be connected in pairs across the lines bit 1 through bit 6 in a predetermined sequence if any of the pairs of terminals selected have a current path between them then one of the SCRs 61-66 will be enabled; therefore setting one of the binary positions of switch 70 to its down position. After selector switch 33 has stepped to position 10, each of the SCRs 61-66 is either enabled or not enabled and therefore switch 70 is now programed for power to be connected to a indicator which will give a visual readout of the physical connections of the selected module. For example in the optimum case where each of the terminals of the selected modules are connected to each other terminal then each of the silicon control rectifiers would be enabled, because each time switch 33 was stepped a complete path was obtained. This causes all of the bits of switch 70 to be in their down positions therefore providing power to the indicator 98 which indicates visually that the module has all terminals connected to each other. After this information is recorded or noted the cycle is repeated by a step in switch 31 position and activating reset switch 68 and start switch 45. These switches are spring loaded so as to tend to stay in the position shown in the drawing.

I claim:

1. A testing circuit for testing a plurality of modules each having a plurality of terminals thereon; first switching means; voltage supply means; a plurality of control switching means having a control input; said first switching means being connected to the terminals of the module so as to selectively connect pairs of the terminals between said voltage supply means and a selected one of the controlled inputs of said control switching means so as to activate the controlled switching means if there is a path between the selected terminals of the module; indicating means connected to said control switching means so as to indicate which terminals of the module have conducting paths therebetween; selector switches having a plurality of contacts and a plurality of sweep arms; said contacts being connected to the terminals of said modules so that by position of the sweep arms a single one of the modules may be selected to be connected to the sweep arms; said sweep arms being connected to said first switching means; said indicating means contains a binary switching system having output connected to visual readout means of the circuit of the module; a plurality of control solenoids for the binary switching system; said plurality of control switching means being silicon control rectifiers; and a voltage supply means connecting individual silicon control rectifiers to selected one of said control solenoids so as to control the position of the binary switch to connect an indicator in accordance with the conditions of the silicon control rectifiers.

* * * * *